United States Patent
White et al.

(10) Patent No.: US 8,535,752 B2
(45) Date of Patent: Sep. 17, 2013

(54) AUTOMATED POWDER-COATING METHOD

(75) Inventors: Nikki O. White, Pontotoc, MS (US); Robert E. Keltz, Tupelo, MS (US); Stephen R. Lake, Tupelo, MS (US)

(73) Assignee: L&P Property Management Company, South Gate, CA (US)

( * ) Notice: Subject to any disclaimer, the term of this patent is extended or adjusted under 35 U.S.C. 154(b) by 254 days.

(21) Appl. No.: 12/908,526

(22) Filed: Oct. 20, 2010

(65) Prior Publication Data

US 2012/0100288 A1    Apr. 26, 2012

(51) Int. Cl.
*B05D 1/12* (2006.01)
*B05D 1/06* (2006.01)

(52) U.S. Cl.
USPC ............... 427/8; 427/180; 427/195; 427/477

(58) Field of Classification Search
USPC ...................... 427/8, 180, 195, 477
See application file for complete search history.

(56) References Cited

U.S. PATENT DOCUMENTS

| | | |
|---|---|---|
| 3,108,022 A | 10/1963 | Church |
| 3,208,868 A | 9/1965 | Strobel et al. |
| 3,946,125 A | 3/1976 | Scheiber |
| 3,965,854 A | 6/1976 | Scheiber |
| 3,965,858 A | 6/1976 | Burdin |
| 4,273,798 A | 6/1981 | Scheiber |
| 4,495,217 A | 1/1985 | Schrum |
| 5,439,704 A * | 8/1995 | Sankaran et al. ............. 427/195 |
| 5,960,930 A * | 10/1999 | Hawkins ....................... 198/577 |
| 7,455,732 B2 | 11/2008 | Orosz et al. |
| 2009/0177306 A1* | 7/2009 | Bosga et al. .................. 700/103 |

\* cited by examiner

*Primary Examiner* — Frederick Parker
(74) *Attorney, Agent, or Firm* — Shook, Hardy & Bacon L.L.P.

(57) ABSTRACT

An automated powder-coating system and method is provided. A series of conveyor belts are arranged end to end to transition one or more work pieces between the conveyor belts. Sensors are used to determine the current location of a work piece with respect to the series of conveyor belts. An induction heating coil for preheating work pieces and a powder-coating apparatus for powder coating work pieces are located adjacent to the conveyor belts. A control unit independently starts and stops the individual conveyor belts based on the current location of the work piece. A cooling area may also be included in the powder-coating system. The powder-coating system and method may be used to powder coat varying lengths of work pieces.

13 Claims, 6 Drawing Sheets

AUTOMATED POWDER-COATING METHOD

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention generally relates to an automated powder-coating method. More particularly, the invention relates to an automated powder-coating method and system for powder coating various lengths of work pieces, such as steel under-frame support parts for furniture pieces.

BACKGROUND OF THE INVENTION

In the manufacture of steel-framed finished products, individual steel pieces are typically coated with a powder-coating material. As an example, the rails that form the floor rails for differing furniture pieces are powder coated. This involves delivering individual pieces of the steel frame along a conveyor belt and into a powder-coating apparatus. Induction heating is commonly used to preheat the steel pieces prior to powder coating. The overall process may also involve the use of a series of conveyor belts that deliver the steel pieces through induction, powder coating, and on to cooling.

One automated method of powder coating involves delivery of steel pieces along a continuous conveyor belt, or series of conveyor belts and/or roller conveyors. The steel pieces are preheated using induction heating coils and delivered at a consistent pace through a powder-coating apparatus. Having passed through the powder-coating apparatus, the steel pieces are transferred along the continuous conveyor belt for cooling and further processing. In some instances, the powder-coated pieces are manually hung in order to allow additional drying time for the powder-coating material. Using this method, the conveyor belt moves at a continuous pace, constantly moving pieces along the conveyor belt and through the powder-coating apparatus. Because the powder-coating method is continuous, and the pieces being delivered along the conveyor belt are the same or similar in length, the consistent speed of the conveyor belt is determined by the time needed to preheat and powder coat the similar-length pieces. The pieces of similar length are typically longer pieces of steel, which allows for a longer time to dry as the longer pieces exit the powder-coating apparatus.

One problem with current automated powder-coating methods is the application of powder coating to shorter-length steel pieces. Using a traditional, continuous conveyor belt method, longer and/or continuous-length steel pieces can wait a longer distance before needing to be contacted upon exiting the powder-coating apparatus, and therefore are able to dry before subsequent contact with the next portion of the conveyor belt. In other words, longer pieces travel a longer distance before contact is required. Conversely, shorter pieces are quicker to require contact upon exiting the powder-coating apparatus, and may not have enough time to sufficiently dry, or "cure," before subsequent contact with the next portion of the conveyor belt. As such, freshly coated surfaces of shorter pieces may have more markings on the pieces from earlier contact with the conveyor belt.

Another problem with current powder-coating methods is the inability to handle inconsistent or varying lengths of steel pieces. For example, traditional powder-coating methods use continuous conveyor belts to transfer steel pieces, which does not take into account the length of the piece and the amount of time it takes the individual piece to complete each step of the process. Timing of the traditional powder-coating process is based on the continuous pace to powder coat longer-length pieces, regardless of the amount of time required for preheating with induction coils, the amount of time required to pass the steel piece through the powder-coating apparatus, and the amount of time required to dry the steel piece at the end of the process.

Accordingly, a need exists for an automated powder-coating method for coating variable lengths of steel pieces.

BRIEF SUMMARY OF THE INVENTION

The present invention generally relates to an automated powder-coating method and system for coating variable sizes of steel pieces. Throughout the remainder of this application, reference will be made to powder coating "work pieces." It should be understood that the invention contemplates powder coating various types of work pieces, both steel under-frame support parts for furniture pieces and otherwise, and that the invention is not limited to the specific component being powder coated. The length and/or size of a work piece may vary. For example, in some embodiments, a work piece may be as short as 17 inches in length. The powder-coating method includes a series of sections of independently moving conveyor belts. As used herein, the term "conveyor belt(s)" refers to any means for conveying one or more work pieces, including using conveyor belts, conveyor rollers, and the like. The current location of a work piece with respect to each conveyor belt section is identified using a sensor. The method also includes an induction heating coil and a powder-coating apparatus located adjacent to the series of conveyor belts. The powder-coating method carries out a novel, automated method for powder coating varying lengths of work pieces.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1:
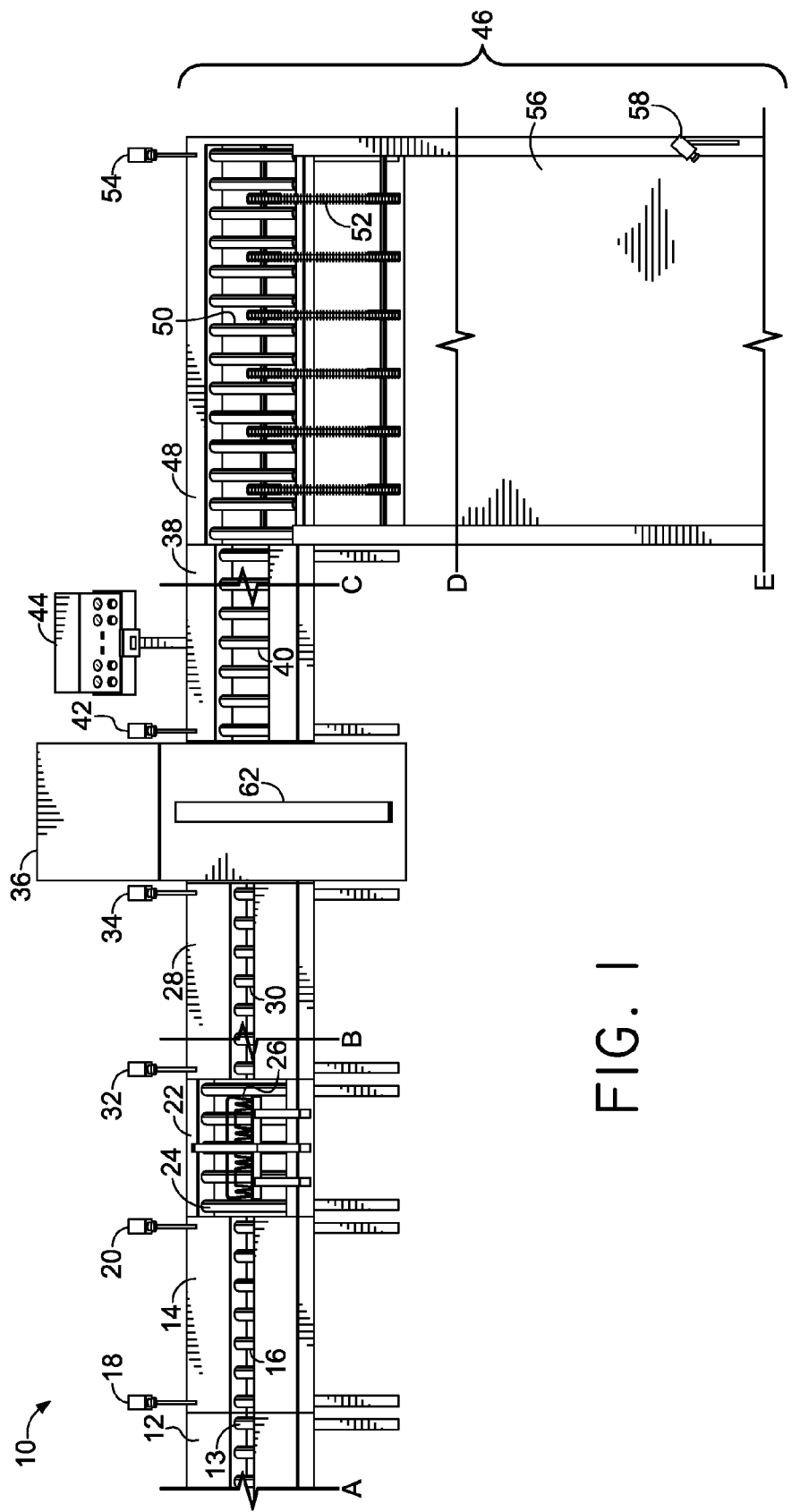
FIG. 1 is a plan view of one embodiment of the powder coating system.

A first embodiment of an automated powder-coating system 10 is seen in FIGS. 1-6. As shown in FIG. 1, the powder-coating system 10 includes a plurality of conveyor belts arranged end to end to transition one or more work pieces between the plurality of conveyor belts. The powder-coating system 10 includes a first conveyor belt 12 arranged end to end with a second conveyor belt 14. The first conveyor belt 12 includes a plurality of conveyor belt rollers 13. In embodiments, the conveyor belt rollers 13 may be stopped and started, depending on the location of a work piece with respect to the first conveyor belt 12.

Figure 2:
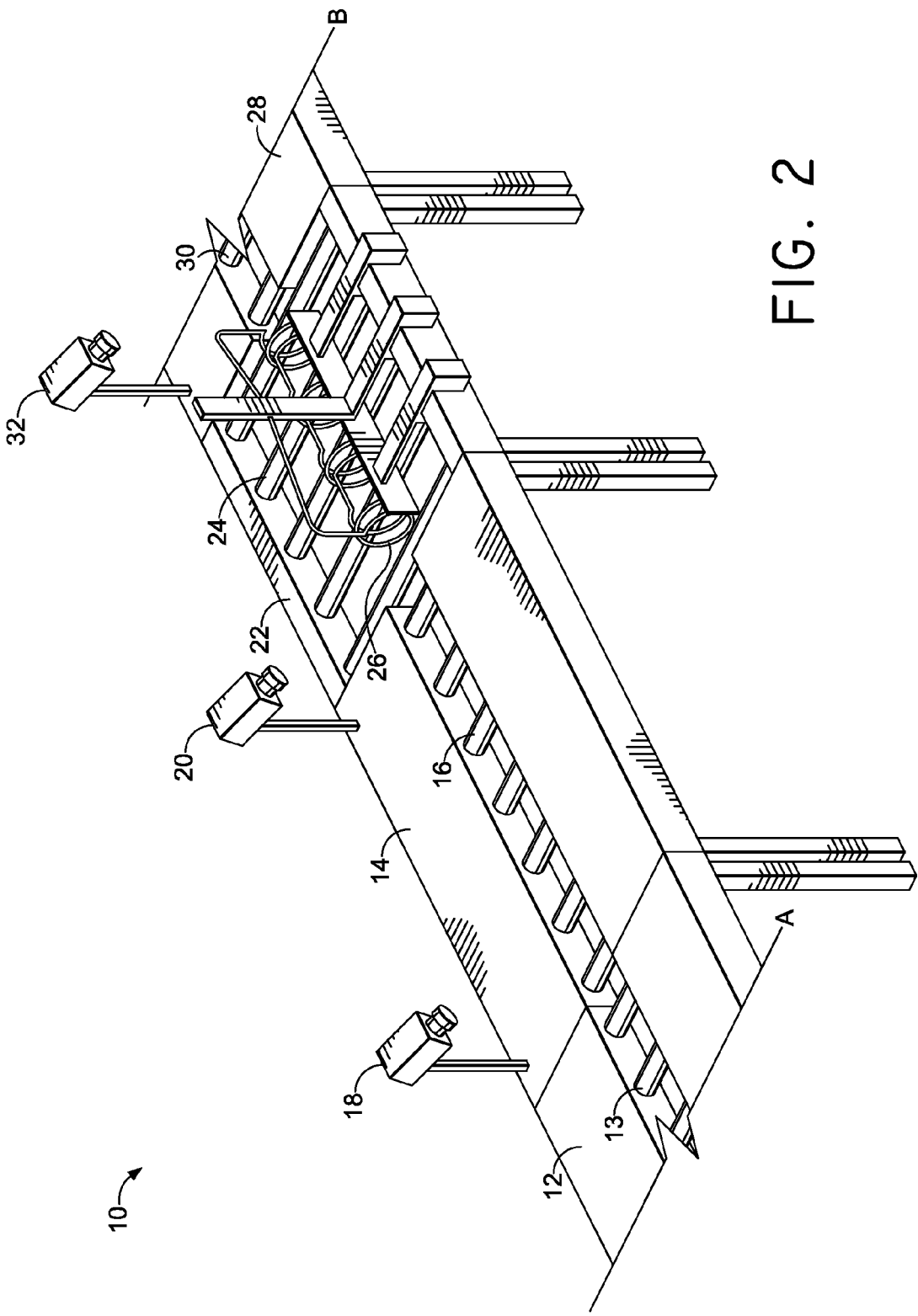
FIG. 2 is a partial, perspective view of the section between lines A and B of FIG. 1.

The second conveyor belt 14 includes a plurality of conveyor belt rollers 16 for transferring a work piece along the second conveyor belt 14, as best seen in FIG. 2. A first sensor 18 and a second sensor 20 are located adjacent to the second conveyor belt 14. The first sensor 18 and second sensor 20 detect the location of a work piece with respect to the second conveyor belt 14. As will be understood, sensors located adjacent to the plurality of conveyor belts in the powder-coating system 10 may be any type of sensor used to detect the presence or absence of a tangible object. For example, a sensor may be a visual sensor, a weight sensor, a heat sensor, a motion-detection sensor, and the like.

The first conveyor belt 12 starts and stops based on detection of a work piece by the first sensor 18. If the first sensor 18 detects that no work piece is currently passing along the first conveyor belt 12 and onto the second conveyor belt 14, and that no work piece is currently passing by the first sensor 18, then the first conveyor belt 12 is turned on and a work piece is passed along the conveyor belt rollers 13 of the first conveyor belt 12. Once the first sensor 18 detects that the entire work piece has passed, the first conveyor belt 12 is turned off and the conveyor belt rollers 13 of the first conveyor belt 12 stop.

A third conveyor belt 22 is arranged end to end with the second conveyor belt 14. As shown in FIG. 2, the third conveyor belt 22 includes a plurality of conveyor belt rollers 24, and an induction heating coil 26 located adjacent to the third conveyor belt 22. The induction heating coil 26 is used to preheat a work piece prior to being powder coated by the powder-coating system 10. The conveyor belt rollers 24 of the third conveyor belt 22 may facilitate preheating a work piece using the induction heating coil 26. For example, the conveyor belt rollers 24 may transfer a work piece through the center of the induction heating coil 26. The second sensor 20, upon detection of a work piece along the second conveyor belt 14, turns on the induction heating coil 26 and slows down the third conveyor belt 22 in order to allow enough time for the induction heating coil 26 to pre-heat the work piece.

Arranged end to end with the third conveyor belt 22 is a fourth conveyor belt 28, which is partially depicted in FIG. 2. The fourth conveyor belt 28 includes a plurality of conveyor belt rollers 30 and a third sensor 32. The second sensor 20 and the third sensor 32 may be used to detect the current location of a work piece with respect to the induction heating coil 26 and/or the third conveyor belt 22.

In embodiments, one or both of the second conveyor belt 14 and the fourth conveyor belt 28 are slowed down when the third conveyor belt 22 is slowed down during heating with the induction heating coil 26. The third sensor 32 senses when a work piece is no longer in contact with the third conveyor belt 22, and shuts off the induction heating coil 26. In embodiments, the third sensor 32 also speeds up the pace of one or both of the second conveyor belt 14 and the fourth conveyor belt 28 after the work piece is heated by the induction heating coil 26. In other words, based on detection by the third sensor 32, conveyor belts 14, 22, and 28 are returned to their original speed prior to heating, and the induction heating coil 26 is turned off.

Figure 3:
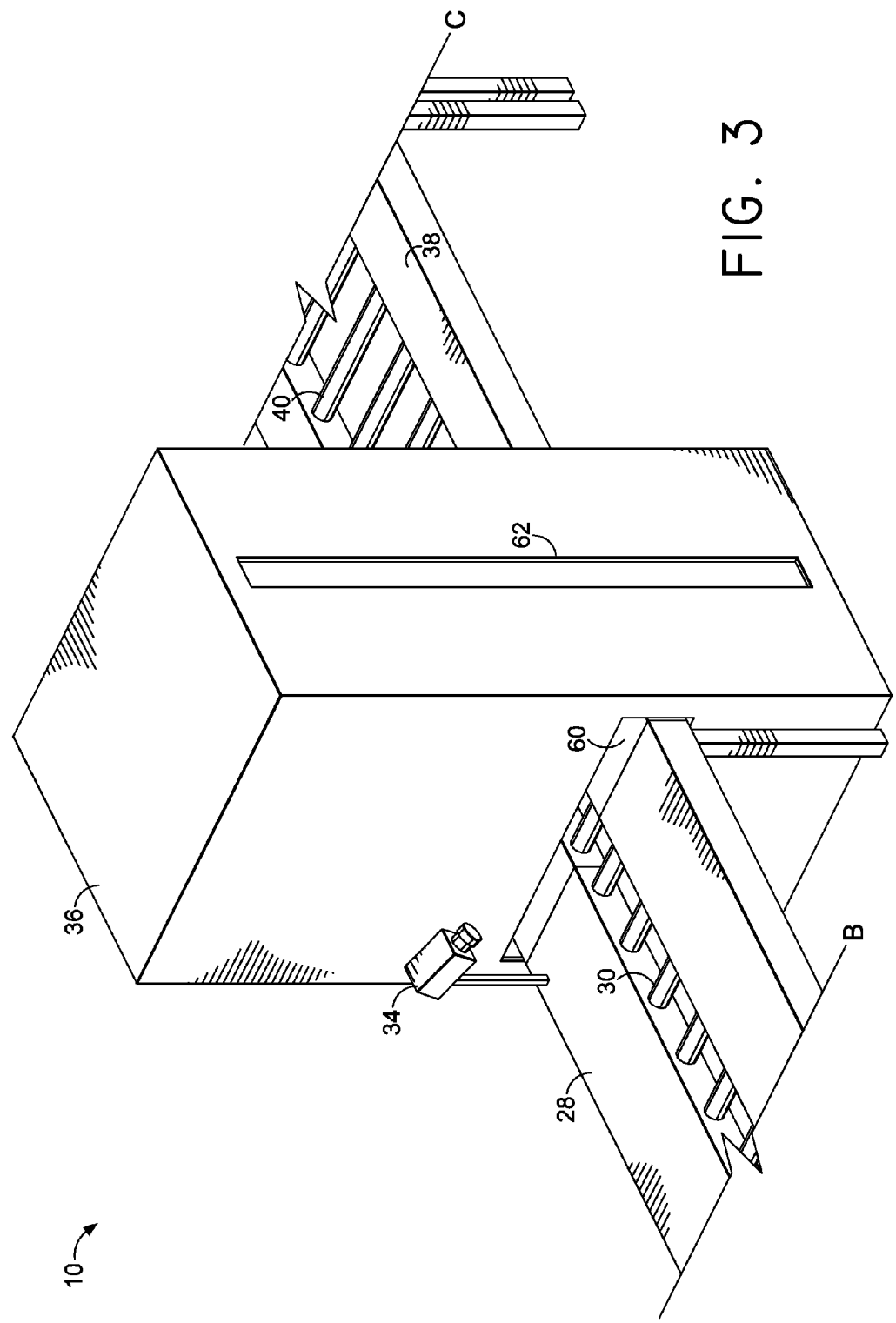
FIG. 3 is a partial, perspective view of the section between lines B and C of FIG. 1.

As best seen in FIG. 3, a fourth sensor 34 is positioned adjacent to the fourth conveyor belt 28. The third sensor 32 and fourth sensor 34 detect the location of a work piece with respect to the fourth conveyor belt 28. Located adjacent to the fourth conveyor belt 28 is a powder-coating apparatus 36. The powder-coating apparatus 36 powder coats work pieces transferred along the plurality of conveyor belts in the powder-coating system 10 using a quick-drying powder-coating media. A work piece enters the powder-coating apparatus 36 through a first opening 60. The powder-coating process taking place inside the powder-coating apparatus 36 may be visually monitored using a second opening 62. As will be understood, a plurality of conveyor belt rollers may be used to transfer the work piece through the powder-coating apparatus 36.

Figure 4:
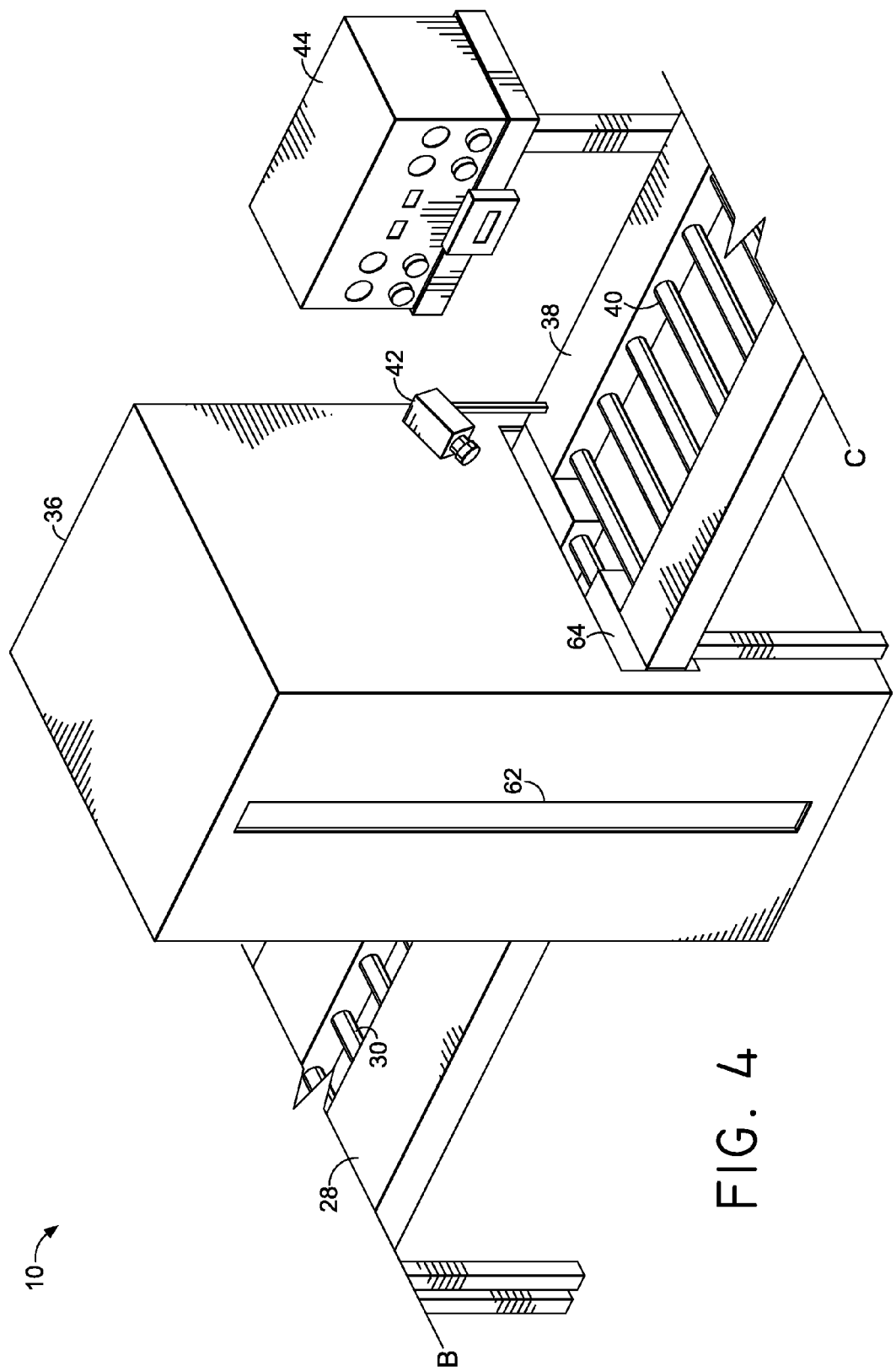
FIG. 4 is a partial, perspective view of the section between lines B and C of FIG. 1, similar to FIG. 3, but from a different point of view.

Located adjacent to the powder coating apparatus 36 is a fifth conveyor belt 38, with a plurality of conveyor belt rollers 40, as best seen in FIG. 4. A fifth sensor 42 and a control unit 44 are located adjacent to the fifth conveyor belt 38. A work piece is transferred onto the fifth conveyor belt 38 after exiting the powder-coating apparatus 36 through a third opening 64 of the powder-coating apparatus 36. The fourth sensor 34 and the fifth sensor 42 are used to control when to turn the powder-coating apparatus 36 on and off.

The control unit 44 variably controls the speed of the individual conveyor belts arranged end to end as part of the powder-coating system 10. The control unit 44 is adapted to selectively start and stop the plurality of conveyor belts based on the current location of a work piece along the powder-coating system 10. In embodiments, the control unit controls conveyor belts 14, 22, 28, and 38 at the same pace, or at varying paces. For example, the conveyor belt 22 may be slowed down by the control unit 44 based on detection of a work piece by the second sensor 20. As previously discussed, in addition to slowing down the conveyor belt 22, the control unit 44 may also slow down conveyor belts 14, 28, and 38. Further, based on detection of the end of a work piece by the third sensor 32, the control unit 44 may speed up conveyor belts 14, 22, 28, and/or 38.

The current location of a work piece along the powder-coating system 10 is determined using one or more of the sensors located adjacent to the powder-coating system 10, such as the first, second, third, fourth, and fifth sensors 18, 20, 32, 34 and 42. For example, the control unit 44 may individually start and stop the first conveyor belt 12 based on detecting the current location of a work piece using the first sensor 18. As such, after the work piece is no longer in contact with the conveyor belt rollers 13 of the first conveyor belt 12, based on detection of the end of the work piece by the first sensor 18, the conveyor belt rollers 13 of the first conveyor belt 12 may be stopped by the control unit 44. Similarly, based on the second sensor 20 detecting the location of a work piece along the second conveyor belt 14, the control unit 44 may cause the conveyor belt rollers 24 of the third conveyor belt 22 to slow down, and the induction heating coil 26 to begin preheating the work piece. Additionally, the conveyor belt rollers 16 and 30 of the second and fourth conveyor belts 14 and 28 may also be slowed during induction heating.

The control unit 44 may also monitor or control different functions associated with the powder-coating system 10, based on detection of the current location of a work piece by one or more sensors. For example, the fifth sensor 42 may be utilized by the control unit 44 to determine the current location of a work piece, in order to turn off the powder-coating apparatus 36 after a work piece exits the third opening 64. Further, the control unit 44 may monitor the temperature of the induction heating coil 26 for preheating a work piece to a desired temperature prior to powder coating.

Figure 5:
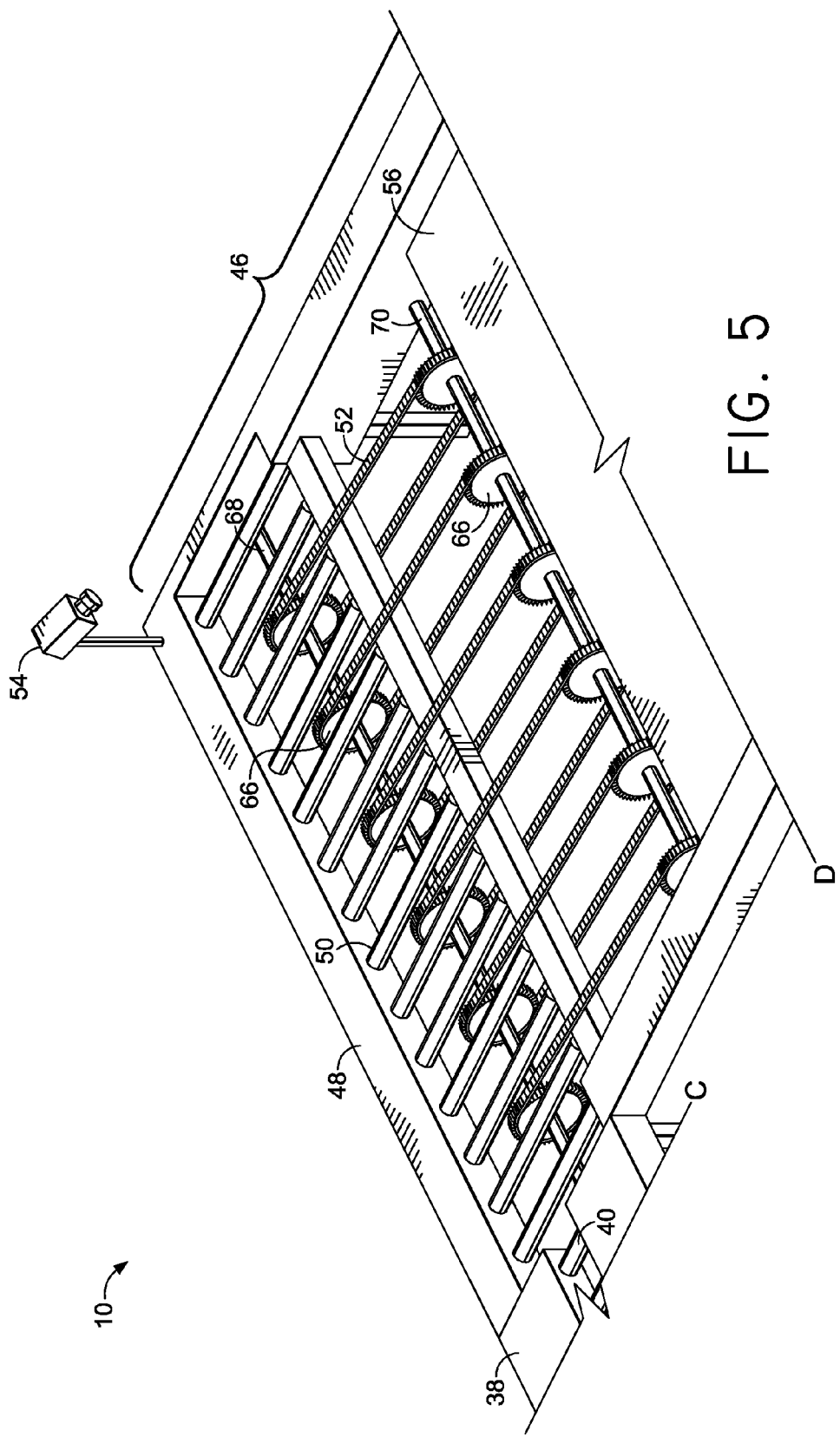
FIG. 5 is a partial, perspective view of the section between lines C and D of FIG. 1.
Figure 6:
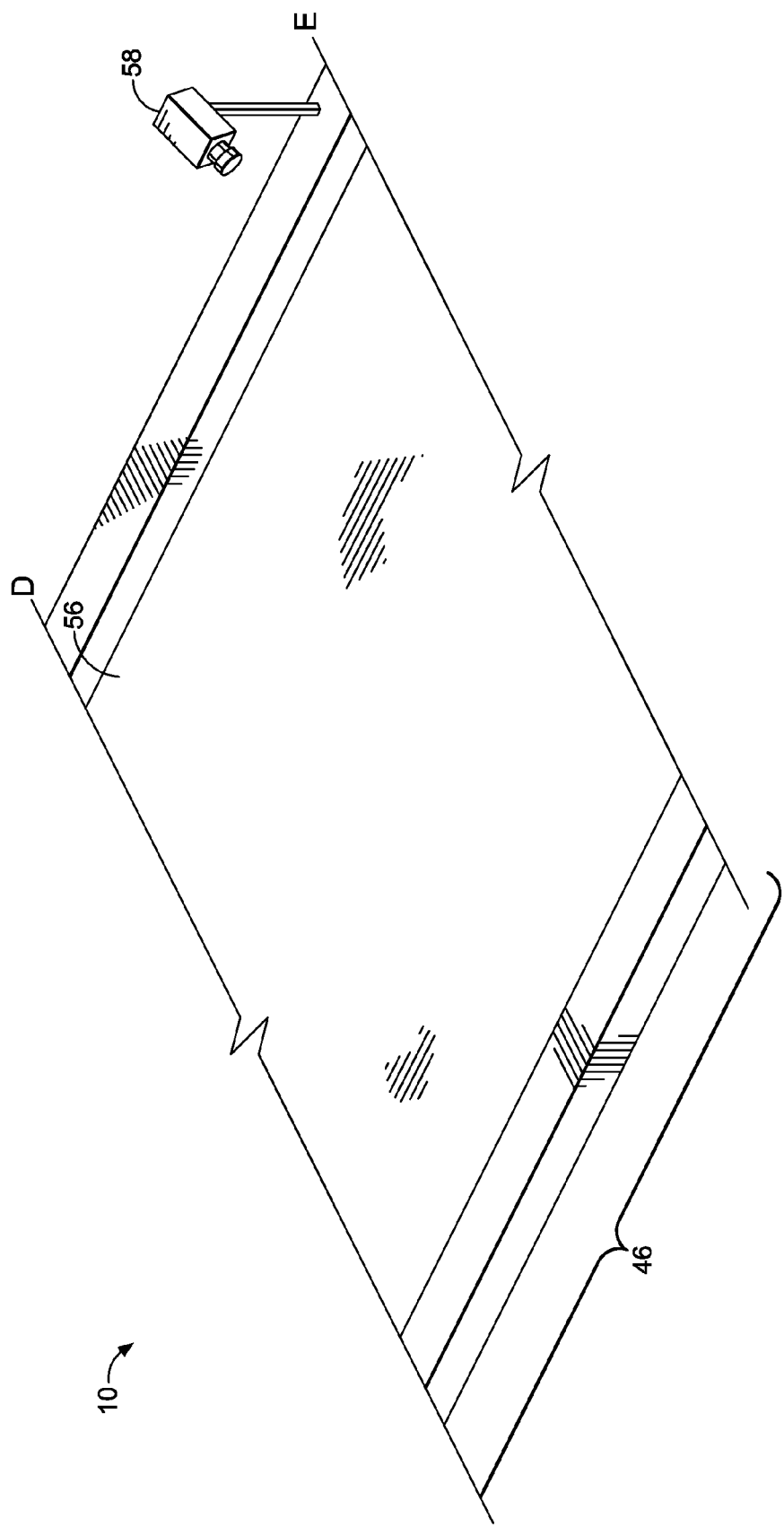
FIG. 6 is a partial, perspective view of the section between lines D and E of FIG. 1.

A cooling area 46 is located adjacent to the plurality of conveyor belts in the powder-coating system 10, as best seen in FIGS. 5-6. The cooling area 46 utilizes air, water, and/or other cooling media to cool work pieces after powder coating by the powder-coating apparatus 36. The cooling area 46 may include a staging area 48 located adjacent to the fifth conveyor belt 38. The staging area 48 transfers work pieces after powder coating using a plurality of conveyor belt rollers 50 and transfer rollers and/or chains 52. As will be understood, the staging area 48 may utilize any number of different means for conveying a work piece in addition or alternative to transfer rollers 52. A sixth sensor 54 is located adjacent to the staging area 48. The location of a work piece with respect to the cooling area 46 may be determined using the sixth sensor 54.

As part of the cooling area 46, the transfer rollers 52 transfer work pieces to the cool-down section 56 of the cooling area 46. As shown in FIG. 5, the transfer rollers 52 are coupled to pairs of transfer wheels 66, which rotate around a first center spindle 68 and a second center spindle 70. The movement of the transfer wheels 66 around the first and second center spindles 68 and 70 causes the corresponding transfer rollers 52 to rotate around the pair of transfer wheels 66. In order to transfer a work piece from the staging area 48 onto the cool-down section 56, the first center spindle 68 raises upward so that a portion of the transfer rollers moves above the conveyor belt rollers 50 and into contact with a work piece on the staging area 48. As such, the transfer rollers 52 are able to transfer a work piece (that was previously in contact with the conveyor belt rollers 50) from the staging area 48 to the cool-down section 56.

As part of the cooling area 46, the cool-down section 56 may utilize air, water, and/or other cooling media to cool the work pieces powder coated by the powder-coating system 10. As shown in FIG. 6, a seventh sensor 58 is located adjacent to the cool-down section 56, and is used to detect the current location of a work piece with respect to the cool-down section 56. The seventh sensor 58 may also be utilized to count work pieces that are being powder-coated by the powder-coating system 10.

In use, the powder-coating system 10 can powder coat varying lengths of work pieces, such as the steel rails that are used for the floor rails for differing furniture pieces. The current location of a work piece along the series of conveyor belts is determined using the sensors located adjacent to the conveyor belts. The control unit 44 independently controls the conveyor belts while transferring the work piece along the conveyor belts. The control unit 44 may adjust the speed at which an individual conveyor belt moves, such as, for example, slowing down the third conveyor belt 22 during induction heating of the work piece, slowing down the speed at which the powder coating apparatus 36 powder coats a work piece, or speeding up any number of conveyor belts after previous slow-down during induction heating and/or powder coating. Monitoring the current location of the work piece and independently controlling the conveyor belts enables a greater variety of lengths of work pieces to be powder coated by the powder-coating system 10.

From the foregoing, it will be seen that this invention is one well adapted to attain all the ends and objects hereinabove set forth together with other advantages, which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. An automated powder-coating method for powder coating one or more work pieces, the method comprising:
   transferring a first work piece along a plurality of conveyor belts, wherein the plurality of conveyor belts are arranged end to end to transition the one or more work pieces between the plurality of conveyor belts, each of the conveyor belts adapted to selectively move independently of each other;
   detecting a current location of the first work piece along the plurality of conveyor belts using a plurality of sensors, the plurality of sensors located adjacent to the plurality of conveyor belts;
   independently controlling each of the plurality of conveyor belts based on detecting the current location of the first work piece, wherein each of the plurality of conveyor belts is selectively controlled by one or more control units located adjacent to the plurality of conveyor belts, wherein independently controlling each of the plurality of conveyor belts comprises slowing down a speed of one conveyor belt of the plurality of conveyor belts to a speed that is slower relative to a speed of at least one other conveyor belt of the plurality of conveyor belts;
   heating the first work piece using an induction heating coil located adjacent to the plurality of conveyor belts; and
   based on heating the first work piece using the induction heating coil, applying a quick-drying powder-coating media to the surface of the first work piece, wherein the powder-coating media is applied using a powder-coating apparatus located adjacent to the plurality of conveyor belts.

2. The method of claim 1, wherein the plurality of sensors comprises a first sensor located adjacent to the plurality of conveyor belts, the first sensor adapted to detect the current location of the first work piece with respect to a first conveyor belt of the plurality of conveyor belts.

3. The method of claim 1, wherein the plurality of sensors comprises:
   a second sensor located adjacent to the plurality of conveyor belts, the second sensor adapted to detect the current location of the first work piece with respect to the induction heating coil.

4. The method of claim 1, wherein the plurality of sensors comprises:
   a third sensor located adjacent to the plurality of conveyor belts, the third sensor adapted to detect the current location of the first work piece with respect to the powder-coating apparatus.

5. The method of claim 1, further comprising:
   transferring a second work piece along the plurality of conveyor belts, the second work piece varying in length from the first work piece.

6. The method of claim 5, further comprising:
   detecting a current location of the second work piece along the plurality of conveyor belts using the plurality of sensors;
   heating the second work piece using the induction heating coil located adjacent to the plurality of conveyor belts; and
   applying a quick-drying powder-coating media to the surface of the second work piece.

7. An automated powder-coating method for powder coating one or more work pieces using a plurality of conveyor belts, the method comprising:
- receiving a first work piece onto a first conveyor belt;
- detecting a first location of the first work piece with respect to the first conveyor belt;
- transferring the first work piece along the first conveyor belt;
- detecting a second location of the first work piece with respect to a second conveyor belt;
- transferring the first work piece along the second conveyor belt;
- heating the first work piece using an induction heating coil located adjacent to the second conveyor belt;
- detecting a third location of the first work piece with respect to a third conveyor belt;
- transferring the first work piece along the third conveyor belt; and
- powder coating the first work piece using a quick-drying powder-coating media, the powder-coating media applied by a powder-coating apparatus located adjacent to the third conveyor belt, wherein the first, second, and third conveyor belts are arranged end to end to transition the one or more work pieces between the plurality of conveyor belts, each of the conveyor belts adapted to selectively move independently of each other, wherein selectively moving independently of each other comprises a speed of one conveyor belt of the plurality of conveyor belts slowing down relative to a speed of at least one other conveyor belt of the plurality of conveyor belts.

8. The method of claim 7, wherein detecting the first location, second location, and third location of the first work piece includes utilizing one or more sensors.

9. The method of claim 7, wherein each of the plurality of conveyor belts is selectively controlled by one or more control units.

10. The method of claim 7, wherein the first work piece is received from at least one steel press located adjacent to the plurality of conveyor belts, the steel press adapted to manufacture the one or more work pieces.

11. The method of claim 7, further comprising:
- detecting a fourth location of the first work piece with respect to a fourth conveyor belt;
- transferring the first work piece along the fourth conveyor belt; and
- cooling the first work piece using at least one cooling area located adjacent to the fourth conveyor belt, wherein the first, second, third, and fourth conveyor belts are arranged end to end to transition the one or more work pieces between the plurality of conveyor belts.

12. The method of claim 11, wherein the at least one cooling area comprises:
- a staging area located adjacent to the plurality of conveyor belts, the staging area for transferring the one or more work pieces after powder coating by the at least one powder-coating apparatus.

13. The method of claim 8, further comprising:
- receiving a second work piece onto the first conveyor belt, the second work piece varying in length from the first work piece;
- transferring the second work piece along the plurality of conveyor belts;
- detecting a current location of the second work piece with respect to the plurality of conveyor belts using the one or more sensors; and
- powder coating the second work piece using a quick-drying powder-coating media, the powder-coating media applied by a powder-coating apparatus located adjacent to the plurality of conveyor belts.

* * * * *